US012748711B2

(12) United States Patent
Wang

(10) Patent No.: US 12,748,711 B2
(45) Date of Patent: Sep. 29, 2026

(54) MICRO-CONTROLLER CHIP CONTAINING MULTI-PROTOCOL COMMUNICATION INTERFACE PERIPHERAL AND OPERATION METHOD THEREOF

(71) Applicant: NANJING QINHENG MICROELECTRONICS CO., LTD., Nanjing (CN)

(72) Inventor: Chunhua Wang, Nanjing (CN)

(73) Assignee: NANJING QINHENG MICROELECTRONICS CO., LTD., Nanjing (CN)

( * ) Notice: Subject to any disclaimer, the term of this patent is extended or adjusted under 35 U.S.C. 154(b) by 317 days.

(21) Appl. No.: 18/262,206

(22) PCT Filed: Jan. 24, 2022

(86) PCT No.: PCT/CN2022/073407
§ 371 (c)(1),
(2) Date: Mar. 10, 2025

(87) PCT Pub. No.: WO2023/082472
PCT Pub. Date: May 19, 2023

(65) Prior Publication Data

US 2026/0023703 A1 Jan. 22, 2026

(30) Foreign Application Priority Data

Nov. 12, 2021 (CN) .......................... 202111339011.9

(51) Int. Cl.
*G06F 13/38* (2006.01)
*G06F 8/61* (2018.01)
(Continued)

(52) U.S. Cl.
CPC .............. *G06F 13/385* (2013.01); *G06F 8/61* (2013.01); *G06F 9/223* (2013.01); *G06F 13/287* (2013.01); *G06F 13/4022* (2013.01)

(58) Field of Classification Search
CPC .. G06F 13/4022; G06F 13/287; G06F 13/385; G06F 8/61; G06F 9/223
(Continued)

(56) References Cited

U.S. PATENT DOCUMENTS 6,298,432 B1 * 10/2001 Goto ......................... G06F 9/52
712/E9.046
10,789,197 B2 * 9/2020 Zhu ..................... G06F 13/4282
(Continued)

FOREIGN PATENT DOCUMENTS

CN 1447228 A * 10/2003
CN 1945925 A * 4/2007
(Continued)

*Primary Examiner* — Christopher B Shin
(74) *Attorney, Agent, or Firm* — CBM PATENT CONSULTING, LLC

(57) ABSTRACT

Disclosed are a micro-controller chip containing a multi-protocol communication interface peripheral and an operation method thereof. The micro-controller chip comprises a multi-protocol communication interface peripheral, the multi-protocol communication interface peripheral is connected to a system bus, the multi-protocol communication interface peripheral is connected with an I/O port, the multi-protocol communication interface peripheral comprises an exclusively used RISC instruction set micro-kernel, a code memory and a code program stored on the code memory and executable by the RISC instruction set micro-kernel, the code program at least comprises two bit operation instructions of 1 setting and 0 clearing, the instruc-
(Continued)

tions are single-cycle instructions, and when the RISC instruction set micro-kernel executes the code program, the I/O port outputs 1 or 0.

10 Claims, 4 Drawing Sheets

(51) Int. Cl.
*G06F 9/22* (2006.01)
*G06F 13/28* (2006.01)
*G06F 13/40* (2006.01)

(58) Field of Classification Search
USPC .............................................................. 710/5
See application file for complete search history.

(56) References Cited

U.S. PATENT DOCUMENTS

| | | | | |
|---|---|---|---|---|
| 2006/0179273 | A1 * | 8/2006 | Cole | G06F 9/3885<br>712/34 |
| 2017/0230907 | A1 * | 8/2017 | Rose | H04B 1/44 |
| 2024/0168893 | A1 * | 5/2024 | Zavalney | G06F 13/387 |

FOREIGN PATENT DOCUMENTS

| | | | | | |
|---|---|---|---|---|---|
| CN | 201503469 | U | * | 6/2010 | |
| CN | 102221991 | B | * | 4/2014 | |
| CN | 104459803 | A | * | 3/2015 | |
| CN | 109684246 | A | * | 4/2019 | G06F 13/385 |
| KR | 20070105328 | A | * | 10/2007 | G06F 9/3885 |

* cited by examiner

MICRO-CONTROLLER CHIP CONTAINING MULTI-PROTOCOL COMMUNICATION INTERFACE PERIPHERAL AND OPERATION METHOD THEREOF

TECHNICAL FIELD

The present invention belongs to the field of micro-controller chip design, and particularly relates to a micro-controller chip containing a flexible multi-protocol communication interface peripheral and an operation method thereof.

BACKGROUND 32-bit high-performance micro-controller (commonly known as MCU) is widely used. In order to support various application environments of various users and realize the universality of the micro-controller, as shown in FIG. 1, a micro-controller chip may generally support various interfaces for external communication, comprising a serial port (UART), a 4-wire SPI, a 2-wire I2C, a 2-wire USB, and the like, and some interfaces also need to provide multiple sets of redundancy for diversified applications, resulting in multiple and redundant MCU peripherals. The 32-bit MCU, such as CH32F103, provides three sets of serial ports, two sets of I2C and two sets of SPI, but only a part of the communication interfaces are usually used in most practical applications.

Most communication interfaces are agreed by the industry and have clear protocols, but there are still some non-consensus communication protocols defined by manufacturers. For example, a 1-wire communication interface lacks sufficient industry consensus, and many chip manufacturers have defined their own 1-wire communication protocols. In addition, a 2-wire communication interface also has the case of many similar names but different actual communication protocols.

As a general micro-controller chip manufacturer, if one chip is considered to be universal, it is necessary to mount controllers for the communication interfaces of the above multiple protocols on a system bus, and these controllers are realized by pure hardware digital logic and support a variety of flexible parameters. However, for the non-consensus communication interfaces with unclear protocols, it is far from a problem of parameters, but a problem of the same name but different protocols. Therefore, the micro-controller chip generally does not provide the communication interfaces of such non-consensus protocols, but leaves it to users to control I/O simulation by software. However, there are shortcomings in the implementation by software, such non-consensus communication protocols are generally low in speed, mostly in tens to hundreds of Kbit, and it may take several microseconds to hundreds of microseconds to transmit a few bytes of data, while a main processor kernel of the high-performance micro-controller chip at least operates in tens or hundreds of MHz, which takes up CPU time and wastes a lot of power for low-speed communication, and a protocol interaction process may be interrupted frequently by other peripherals of the system. However, if an interrupt method is used for implementation, frequent interference may be caused to the micro-controller chip which will be interrupted every few microseconds, thus reducing the system efficiency.

SUMMARY

Object of invention: in order to solve the problem that an existing high-performance micro-controller is not convenient to support a non-consensus communication protocol, and the problem that an existing communication interface peripheral cannot support a flexible protocol and causes a waste because of needing to provide multiple sets of redundant fixed protocol communication interfaces, the present invention provides a micro-controller chip containing a multi-protocol communication interface peripheral and an operation method thereof.

Technical solution: a micro-controller chip containing a multi-protocol communication interface peripheral comprises a main processor kernel, a system bus, a plurality of on-chip peripherals and an I/O port, wherein the on-chip peripheral further comprises a multi-protocol communication interface peripheral, the multi-protocol communication interface peripheral is located in an interior of a chip, the multi-protocol communication interface peripheral is connected to a system bus, the multi-protocol communication interface peripheral is connected with the I/O port, the multi-protocol communication interface peripheral comprises a RISC instruction set micro-kernel, a code memory and a code program stored on the code memory and executable by the RISC instruction set micro-kernel, the code program at least comprises two bit operation instructions of 1 setting and 0 clearing, the instructions are single-cycle instructions, when the RISC instruction set micro-kernel executes the code program, the I/O port outputs 1 or 0, and the RISC instruction set micro-kernel is exclusively used for controlling output and input of the I/O port.

Further, a data bit width of the main processor kernel is 32 bits or 64 bits, and a data bit width of the RISC instruction set micro-kernel is 4 bits or 8 bits.

Further, the micro-controller chip containing the multi-protocol communication interface peripheral further comprises a selector, wherein the multi-protocol communication interface peripheral and the main processor kernel are connected with the I/O port through the selector, and the selector is used for selecting whether the multi-protocol communication interface peripheral is connected with the I/O port or the main processor kernel is connected with the I/O port.

Further, the code memory is SRAM, the code memory is connected to the system bus, and the code memory is also used for storing data of the main processor kernel. The SRAM is convenient to dynamically load the object codes of the I/O port control programs of different protocols. The SRAM may also be used as the data memory of the main processor when the multi-protocol communication interface peripheral is not needed.

Further, the code memory is a one-time programmable memory OTP, and the code program in the code memory is preset by a micro-controller chip manufacturer before leaving the factory.

Further, the main processor kernel contains a plurality of peripheral data exchange registers, the peripheral data exchange registers are arranged on one side of the multi-protocol communication interface peripheral, the peripheral data exchange registers correspond to N data registers of the data bit width of the RISC instruction set micro-kernels, and N is a value of the data bit width of the main processor kernel divided by the data bit width of the RISC instruction set micro-kernel.

Further, the main processor kernel further comprises an interrupt controller, and the multi-protocol communication interface peripheral is connected with the interrupt controller through an interrupt request signal line.

The micro-controller chip containing the multi-protocol communication interface peripheral further comprises at least one of a DMA controller and an arbiter, wherein the multi-protocol communication interface peripheral is connected with at least one of the DMA controller and the arbiter through several signal lines.

Further, no more than four I/O ports connected with the multi-protocol communication interface peripheral are provided.

An operation method of the micro-controller chip containing the multi-protocol communication interface peripheral above comprises the following steps of:

burning a main program object code into a Flash memory of the micro-controller chip, wherein the main program object code comprises an object code of an I/O port control program, and the object code of the I/O port control program is developed based on the RISC instruction set micro-kernel;

electrifying or resetting the chip, wherein the RISC instruction set micro-kernel is disabled by default, and the main processor kernel loads the object code of the I/O port control program from the Flash memory of the chip to the code memory in the multi-protocol communication interface peripheral in the interior of the chip; and enabling the RISC instruction set micro-kernel to operate, wherein the RISC instruction set micro-kernel is exclusively used for controlling output and input of the I/O port.

The present invention provides the micro-controller chip containing the multi-protocol communication interface peripheral and the operation method thereof, and compared with the prior art, the present invention has the following beneficial effects.

(1) Flexibility and universality. As for the communication interface peripheral in the interior of the micro-controller chip, a traditional solution aims at a single communication protocol, while the present invention designs the multi-protocol communication interface peripheral, through which diversified non-consensus communication protocols may be faced easily by loading the object codes of the I/O port control programs of different communication protocols, thus further improving the universality of the micro-controller chip.

(2) Upgradeability. A common communication interface controller has been arranged in the interior of a general micro-controller chip when designed, leading to incapability of new addition after manufacturing, and incapability of being applied to major revision and upgrade of the communication protocol. However, after the micro-controller chip designed according to the present invention is manufactured, version upgrade of a third-party communication protocol may still be followed by updating the I/O port control program of the communication protocol, thus improving a compatibility of the micro-controller chip and a capability of adapting to changes of technology and market.

(3) Low cost. The RISC instruction set micro-kernel in the multi-protocol communication interface peripheral is the exclusively used RISC instruction set micro-kernel, is exclusively used for processing an I/O interface protocol, and can optimize a performance and a cost of the kernel, reduce a bit width to reduce the cost, increase or optimize a single-cycle bit operation instruction to improve I/O operation efficiency, and reduce unnecessary address space and algorithm instructions to control a scale and a cost of the kernel, so that only a scale of 2,000 to 3,500 gates is needed to realize the multi-protocol communication interface peripheral. As a contrast, an exclusively used peripheral controller for a conventional I2C protocol two-wire interface also needs a scale of more than 2,000 gates; and for a basic 32-bit M3 kernel as the main processor kernel, a scale of about 70,000 gates is needed, and for a 64-bit kernel, the scale is multiplied. It can be seen that the scale of the exclusively used RISC instruction set micro-kernel is of the same level as that of the ordinary peripheral of the exclusively used protocol, and is far smaller than that of the main processor kernel, which is completely different from the goal and idea of adopting a dual-kernel or even multi-kernel micro-controller solution in pursuit of a computing performance. In addition, the universality enables the system solution to reduce a part of redundant or standby communication interfaces, thus further saving the cost.

The reason why the high flexibility can be achieved at the low cost is due to the pertinence of the solution and the understanding of the design goal of the micro-kernel, and for the I/O interface protocol, especially the medium and low-speed serial interface protocol below several MHz, there are a small data volume and a low speed, thus being suitable for the exclusively used RISC instruction set micro-kernel to simulate the interface communication protocol with several instructions, so as to exchange more time for the smaller hardware scale and the higher flexibility. In contrast, the exclusively used controller for the pure hardware digital logic is more suitable for the high-speed interface determined by the protocol.

DETAILED DESCRIPTION

The present invention is further explained and described hereinafter with reference to the drawings and specific embodiments.

Embodiment 1

A micro-controller chip containing a multi-protocol communication interface peripheral comprises a main processor kernel, a system bus, a plurality of on-chip peripherals and an I/O port. The on-chip peripheral comprises the multi-protocol communication interface peripheral, the multi-protocol communication interface peripheral is hung on the system bus of the micro-controller chip as one of the plurality of on-chip peripheral modules, and connected through a clock signal line, a reset signal line, an address signal line and a data signal line, and the address signal line and the data signal line are contained in the system bus. The multi-protocol communication interface peripheral is connected with an I/O port, the multi-protocol communication interface peripheral comprises a RISC instruction set micro-kernel, a code memory and a code program stored on the code memory and executable by the RISC instruction set micro-kernel, the code program at least comprises two bit operation instructions of 1 setting and 0 clearing, the instructions are single-cycle instructions, and when the RISC instruction set micro-kernel executes the code program, the I/O port outputs 1 or 0 efficiently. Further, the code program may further comprise shift operation instructions such as left shift and right shift, and instructions such as bit copying, bit insertion, bit testing and cycling, so as to support I/O status reading, output setting operation and interface protocol imitation more efficiently.

In this embodiment, a data bit width of the main processor kernel is 32 bits, or more than 32 bits, such as 64 bits; and a data bit width of the RISC instruction set micro-kernel is 8 bits, or no more than 8 bits, such as 4 bits.

The RISC instruction set micro-kernel is an exclusively used RISC instruction set micro-kernel, and exclusively used for controlling output and input of the I/O port. After optimization, the bit width is small and the speed is high, and the bit operation instructions are optimized to improve I/O operation efficiency, and reduce unnecessary large address space and algorithm instructions to control a scale of the micro-kernel, so as to save a cost. Different from a parallel dual-kernel design of basically equal grade in a common dual-kernel CPU, the RISC instruction set micro-kernel is only used as a peripheral of the system bus, shows similar characteristics and permissions to an exclusively used controller for common hardware logic, is exclusively used for processing an I/O interface protocol, and has a scale and required resources are far less than those of the main processor kernel.

Figure 1:
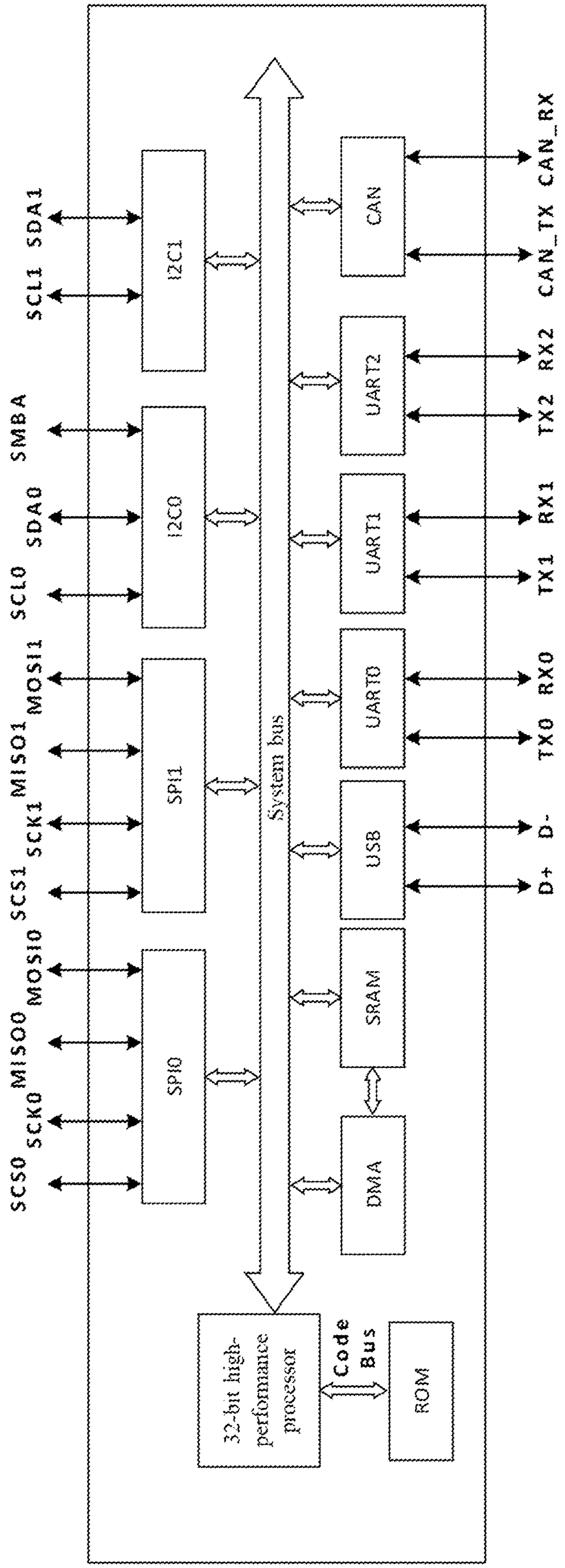
FIG. 1 is an architecture diagram of a 32-bit high-performance micro-controller in the prior art, which has a redundant peripheral and usually has no 1-wire interface.
Figure 2:
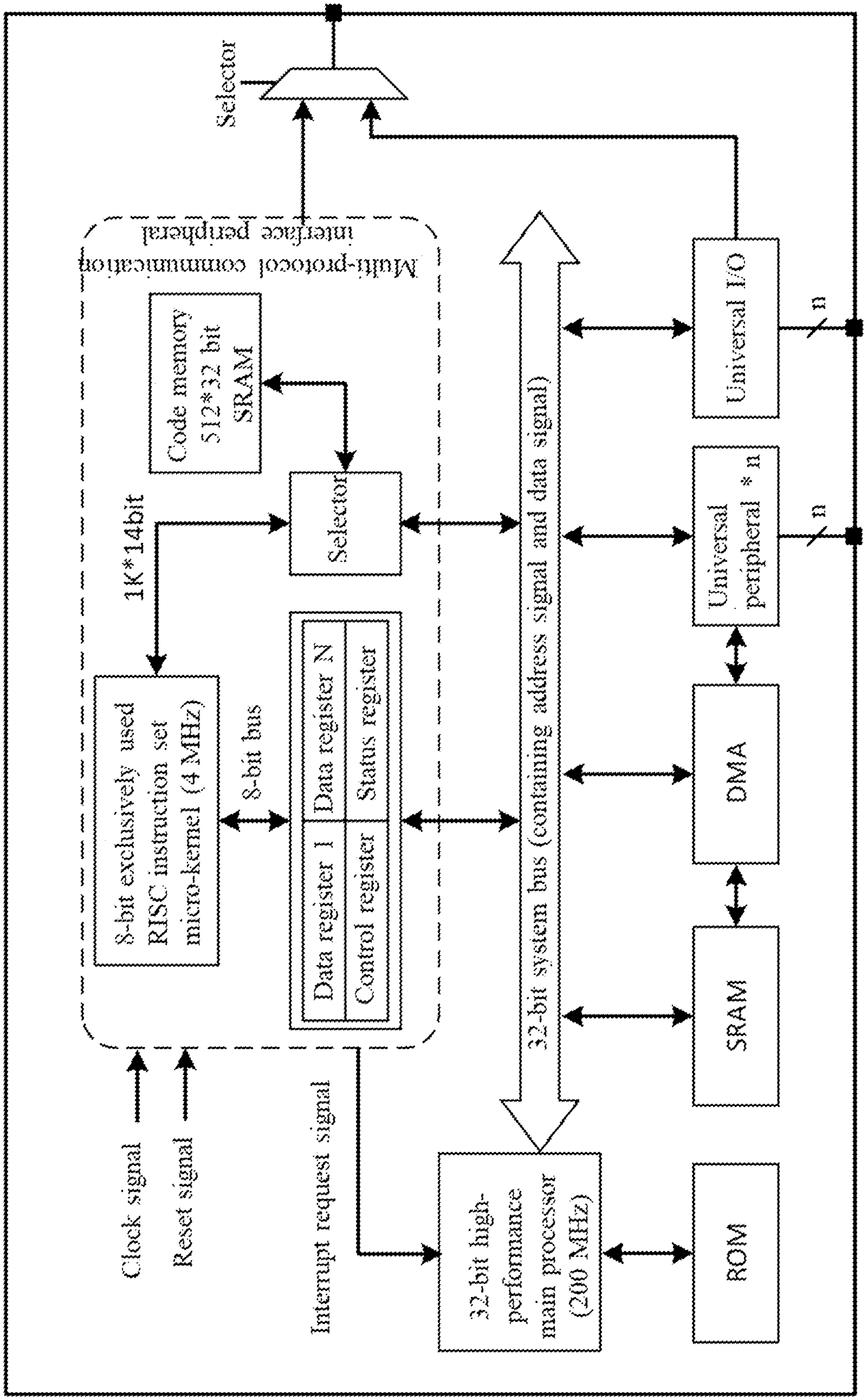
FIG. 2 is an architecture diagram of a micro-controller containing a multi-protocol communication interface peripheral in Embodiment 1.
Figure 3:
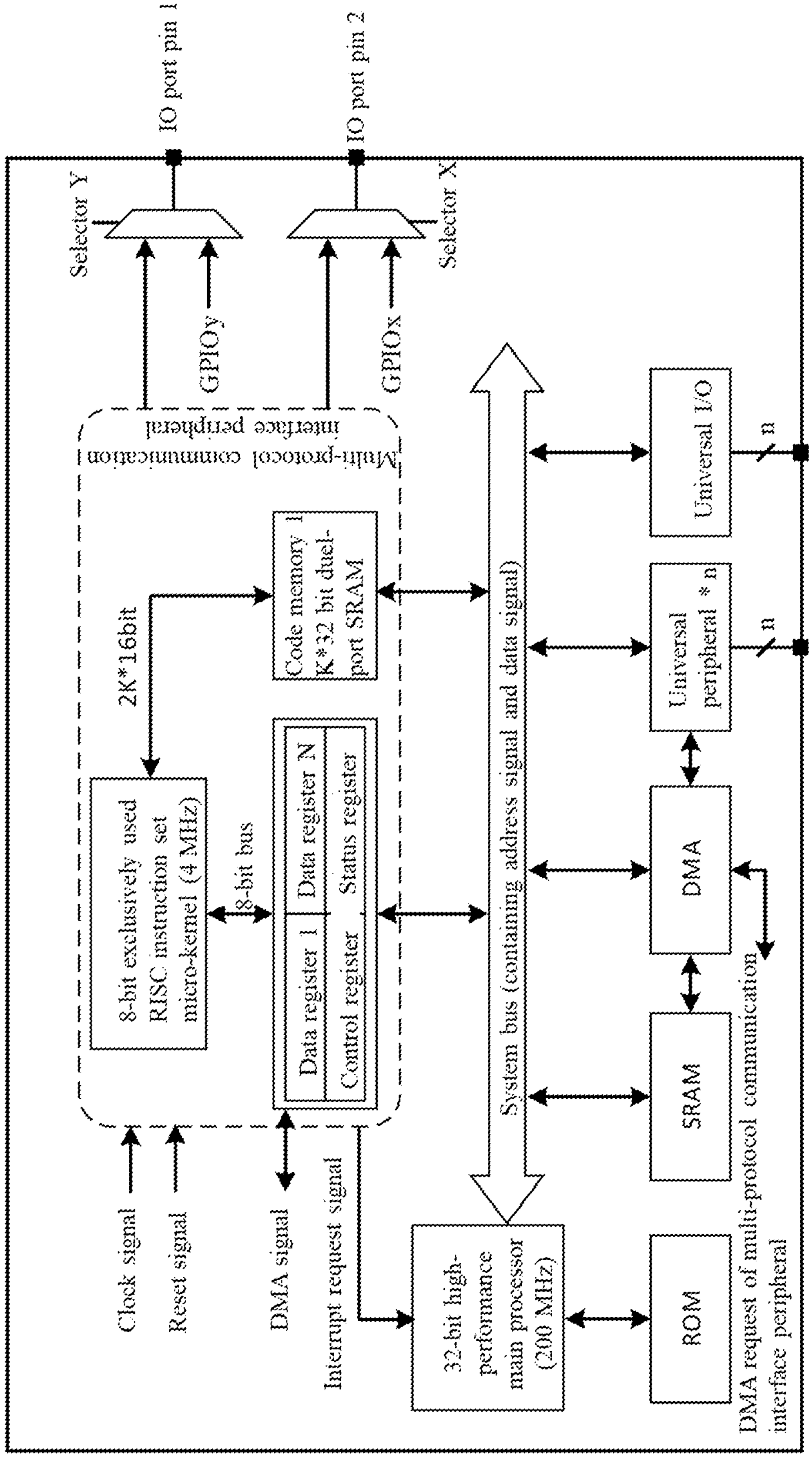
FIG. 3 is an architecture diagram of a micro-controller containing a multi-protocol communication interface peripheral in Embodiment 2.
Figure 4:
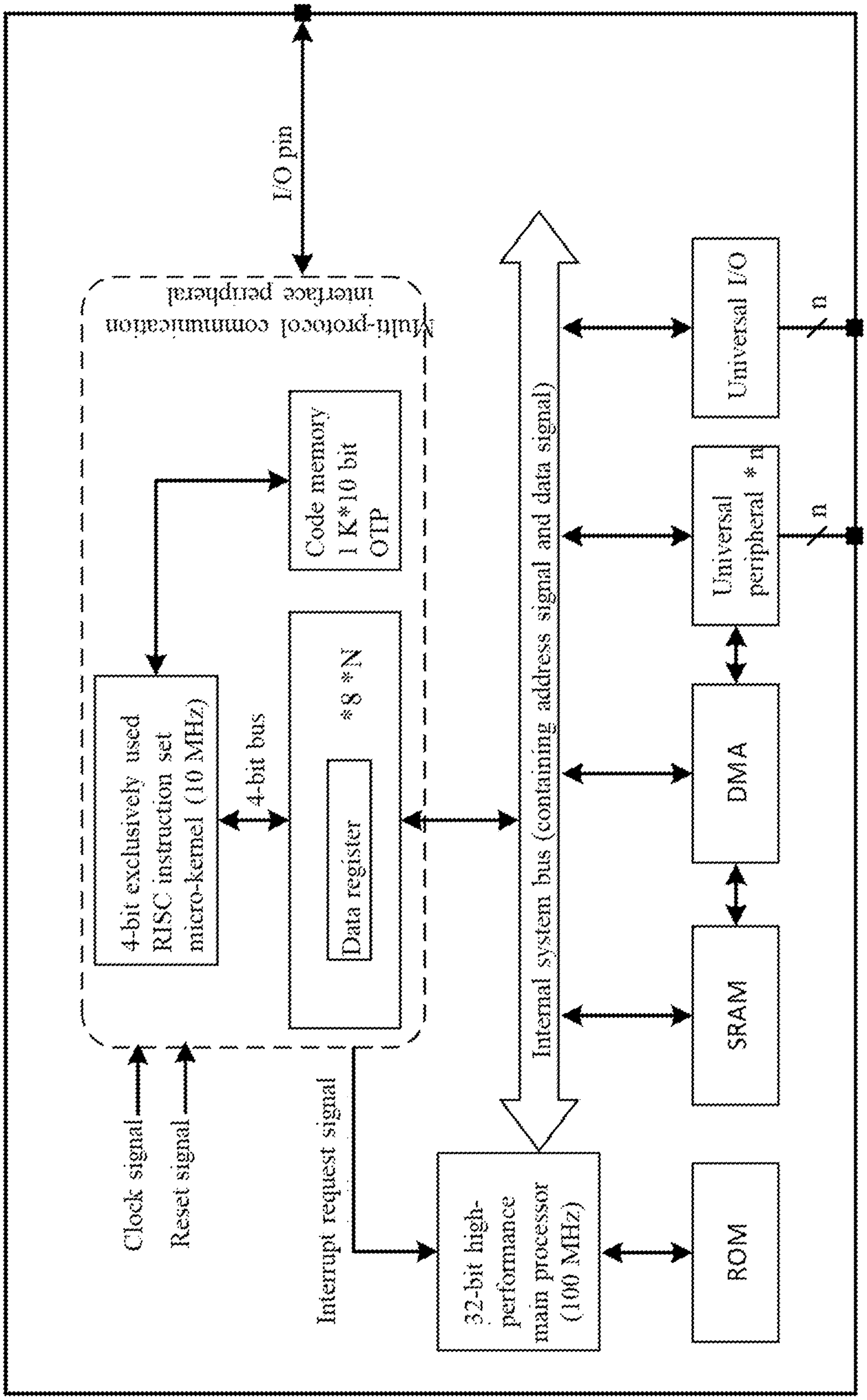
FIG. 4 is an architecture diagram of a micro-controller containing a multi-protocol communication interface peripheral in Embodiment 3.

In this embodiment, the multi-protocol communication interface peripheral contains 1-wire external connection, and is connected with one I/O port, and the multi-protocol communication interface peripheral may also be connected with different numbers of I/O ports as required, wherein the number is generally no more than four. The multi-protocol communication interface peripheral may be directly connected with the I/O port, or may be connected with the I/O port through a selector. As shown in FIG. 2, in this embodiment, the multi-protocol communication interface peripheral and the main processor kernel are connected with the I/O port through the selector, and the selector is used for selecting whether the multi-protocol communication interface peripheral is connected with the I/O port or the main processor kernel is connected with the I/O port. When the peripheral is not needed, the main processor kernel may be connected with the I/O port, and the I/O portion is directly used as an ordinary GPIO.

In this embodiment, multiple instructions of the RISC instruction set micro-kernel are stored in the code memory. In this embodiment, the code memory is a SRAM with a 512*32 bit structure, and has a data bit width of 32 bits, which is convenient for efficient connection to the system bus. However, when the SRAM provides the instructions as the code memory, 4 bits are discarded every 32 bits, and a data interface of 1K*14 bit is combined, so that the SRAM may be used to store 1024 14-bit-width instructions. The SRAM allows a user to voluntarily write a communication protocol program to realize a self-defined communication interface, and when the multi-protocol communication interface peripheral is not used, the SRAM may also be used as the data memory of the main processor to store data without wasting resources. For a single-port SRAM, the system bus and an instruction channel of the RISC instruction set micro-kernel may be connected with the SRAM through the selector or an arbiter; and for a dual-port SRAM, the system bus and the instruction channel of the RISC instruction set micro-kernel are respectively connected with one port of the SRAM.

The main processor kernel contains a plurality of peripheral data exchange registers, comprising an input data register, an output data register, a control register, a status register, and the like, the peripheral data exchange registers are arranged on one side of the multi-protocol communication interface peripheral, each peripheral data exchange register corresponds to no more than four data registers of the data bit width of the RISC instruction set micro-kernel, and the four is obtained by dividing the data bit width of 32 of the main processor kernel by the data bit width of 8 of the RISC instruction set micro-kernel. Four 8-bit-width data are combined and then submitted to the system bus according to 32 bits, which is convenient for the main processor to access in a single cycle, thus saving CPU time of the main processor kernel.

The main processor kernel further comprises an interrupt controller, and the multi-protocol communication interface peripheral is connected with the interrupt controller through an interrupt request signal line.

An operation method of the micro-controller chip containing the multi-protocol communication interface peripheral above comprises the following steps.

A main program object code is burned into a Flash memory of the micro-controller chip, wherein the main program object code comprises an object code of an I/O port control program. The object code of the I/O port control program is developed in advance based on the RISC instruction set micro-kernel, I/O port control programs of several communication protocols may be developed in advance, and the I/O port control program of the corresponding communication protocol is selected according to actual needs, which is integrated into the main program object code of the micro-controller chip.

The chip is electrified or reset, wherein the RISC instruction set micro-kernel is disabled by default, the main processor kernel operates first, and the main processor kernel loads the object code of the I/O port control program from the Flash memory of the chip to the code memory in the multi-protocol communication interface peripheral in the interior of the chip.

Therefore, the RISC instruction set micro-kernel operates.

The loading of the object code and the operation of the RISC instruction set micro-kernel may also be executed only when needed.

In addition, after the chip is electrified or reset, the object code of the I/O port control program may also be loaded from the Flash memory of the chip to the code memory in the multi-protocol communication interface peripheral by hardware to make the RISC instruction set micro-kernel operate.

In addition, according to needs, during the operation of the RISC instruction set micro-kernel, the object code of the I/O port control program may also be changed at any time, the RISC instruction set micro-kernel is disabled first, the main processor kernel loads the new object code of the I/O port control program from the Flash memory of the chip to the code memory in the multi-protocol communication interface peripheral, and the communication protocol may be updated by operating the RISC instruction set micro-kernel again.

Embodiment 2

Embodiment 2 is different from Embodiment 1 in that, the data bit width of the main processor kernel in Embodiment 2 is 32 bits, and a main frequency is 200 MHz; and the data bit width of the RISC instruction set micro-kernel is 8 bits, and a main frequency is 200 MHz, wherein the code memory is the dual-port SRAM with the 1K*32 bit structure. When a code is provided, low 16 bits or 16 bits of 32-bit data are selected by a lowest address signal to output, so as to constitute a 4 KB instruction storage space of 2 K*16 bit. There are two external IO connections and mode control thereof, and the two I/O ports are connected through a plurality of control signal lines, mode signal lines and input/output signal lines, thus realizing serial-port, two-wire and one-wire protocol communication.

The micro-controller chip further comprises a DMA controller and/or an arbiter, and the multi-protocol communication interface peripheral is connected with the DMA controller and/or the arbiter through a plurality of signal lines, which is convenient to exchange data with the main memory of the system directly, thus further reducing occupation of CPU time of the main processor kernel.

Embodiment 3

Embodiment 3 is only different from Embodiment 1 in that the data bit width of the main processor kernel in Embodiment 3 is 32 bits, and a main frequency is 100 MHz; and the data bit width of the RISC instruction set micro-kernel is 4 bits, and a main frequency is 10 MHz. Every eight data registers on one side of the RISC micro-kernel are combined into one 32-bit register capable of being efficiently accessed by the main processor, and a plurality of such 32-bit registers are provided for data exchange and bit and status control. There are 1-wire external IO connection and mode control thereof, and one I/O port is connected through multiple signals. The code memory is a one-time programmable memory OTP with a lower cost than Flash, and has an instruction storage space of 1 K*10 bit. A code in the OTP may be preset by a micro-controller chip manufacturer before leaving the factory, and is completely independent of the main program of the micro-controller, which is convenient to keep a secret from a user and improve security. Compared to the redesign of a pure hardware controller, the preset of the object program of the interface protocol before the chip leaves the factory saves time of multiple stages such as chip back-end wiring, data processing, board making, chip casting and packaging, which is conducive to rapid upgrade of a protocol and timely response to a market demand.

What is claimed is:

1. A micro-controller chip containing a multi-protocol communication interface peripheral, comprising a main processor kernel, a system bus, a plurality of on-chip peripherals and an I/O port, wherein at least one of the plurality of on-chip peripherals further comprises the multi-protocol communication interface peripheral, the multi-protocol communication interface peripheral is located in an interior of the micro-controller chip, the multi-protocol communication interface peripheral is connected to the system bus, the multi-protocol communication interface peripheral is connected with the I/O port, the multi-protocol communication interface peripheral comprises a RISC instruction set micro-kernel, a code memory and a code program stored on the code memory and executable by the RISC instruction set micro-kernel, the code program at least comprises two bit operation instructions of 1 setting and 0 clearing, the instructions are single-cycle instructions, when the RISC instruction set micro-kernel executes the code program, the I/O port outputs 1 or 0, and the RISC instruction set micro-kernel is exclusively used for controlling output and input of the I/O port.

2. The micro-controller chip containing the multi-protocol communication interface peripheral according to claim 1, wherein a data bit width of the main processor kernel is 32 bits or 64 bits, and a data bit width of the RISC instruction set micro-kernel is 4 bits or 8 bits.

3. The micro-controller chip containing the multi-protocol communication interface peripheral according to claim 1, further comprising a selector, wherein the multi-protocol communication interface peripheral and the main processor kernel are connected with the I/O port through the selector, and the selector is used for selecting whether the multi-protocol communication interface peripheral is connected with the I/O port or the main processor kernel is connected with the I/O port.

4. The micro-controller chip containing the multi-protocol communication interface peripheral according to claim 1, wherein the code memory is a SRAM, the code memory is connected to the system bus, and the code memory is also used for data storage of the main processor kernel.

5. The micro-controller chip containing the multi-protocol communication interface peripheral according to claim 1, wherein the code memory is a one-time programmable memory OTP, and the code program in the code memory is preset by a micro-controller chip manufacturer before leaving the factory.

6. The micro-controller chip containing the multi-protocol communication interface peripheral according to claim 1, wherein the main processor kernel contains a plurality of peripheral data exchange registers, the peripheral data exchange registers are arranged on one side of the multi-protocol communication interface peripheral, the peripheral data exchange register corresponds to N data registers of the data bit width of the RISC instruction set micro-kernel, and N is a value of the data bit width of the main processor kernel divided by the data bit width of the RISC instruction set micro-kernel.

7. The micro-controller chip containing the multi-protocol communication interface peripheral according to claim 1, wherein the main processor kernel further comprises an interrupt controller, and the multi-protocol communication interface peripheral is connected with the interrupt controller through an interrupt request signal line.

8. The micro-controller chip containing the multi-protocol communication interface peripheral according to claim 1, further comprising at least one of a DMA controller and an arbiter, wherein the multi-protocol communication interface peripheral is connected with at least one of the DMA controller and the arbiter through several signal lines.

9. The micro-controller chip containing the multi-protocol communication interface peripheral according to claim 1, wherein no more than four I/O ports connected with the multi-protocol communication interface peripheral are provided.

10. An operation method of the micro-controller chip containing the multi-protocol communication interface peripheral according to claim 1, comprising the following steps of:

burning a main program object code into a Flash memory of the micro-controller chip, wherein the main program object code comprises an object code of an I/O port control program, and the object code of the I/O port control program is developed based on the RISC instruction set micro-kernel;

electrifying or resetting the chip, wherein the RISC instruction set micro-kernel is disabled by default, and the main processor kernel loads the object code of the I/O port control program from the Flash memory of the chip to the code memory in the multi-protocol communication interface peripheral in the interior of the chip; and enabling the RISC instruction set micro-kernel to operate, wherein the RISC instruction set micro-kernel is exclusively used for controlling output and input of the I/O port.

* * * * *